(12) United States Patent
Ruckmann et al.

(10) Patent No.: US 6,581,091 B1
(45) Date of Patent: Jun. 17, 2003

(54) PROGRAM PARAMETER UPDATING METHOD

(75) Inventors: Peter Ruckmann, Paderborn (DE); Detlef Manske, Paderborn (DE); Stefan Frerich, Paderborn (DE)

(73) Assignee: Siemens Nixdorf Informationssysteme Aktiengesellschaft, Paderborn (DE)

( * ) Notice: Subject to any disclaimer, the term of this patent is extended or adjusted under 35 U.S.C. 154(b) by 0 days.

(21) Appl. No.: 09/352,454

(22) Filed: Jul. 13, 1999

Related U.S. Application Data

(63) Continuation-in-part of application No. 08/890,305, filed on Jul. 9, 1997, now abandoned.

(30) Foreign Application Priority Data

Mar. 12, 1997 (DE) .......................................... 197 10 250

(51) Int. Cl.[7] .............................................. G06F 13/00
(52) U.S. Cl. ........................ 709/219; 709/203; 709/228
(58) Field of Search ................................ 709/203, 217, 709/219, 223, 224, 225, 228, 313, 328, 329; 707/203

(56) References Cited

U.S. PATENT DOCUMENTS

| | | | |
|---|---|---|---|
| 5,418,957 A | | 5/1995 | Narayan |
| 5,715,453 A | * | 2/1998 | Stewart ...................... 707/104 |
| 5,845,077 A | * | 12/1998 | Fawcett ...................... 709/221 |
| 5,867,660 A | * | 2/1999 | Schmidt et al. ............. 709/227 |
| 5,889,958 A | * | 3/1999 | Willens ...................... 709/229 |
| 6,006,034 A | * | 12/1999 | Heath et al. ................. 395/712 |
| 6,029,196 A | * | 2/2000 | Lenz ........................... 709/221 |
| 6,074,434 A | * | 6/2000 | Cole et al. .................... 717/11 |
| 6,078,951 A | * | 6/2000 | Pashupathy et al. ......... 709/217 |

FOREIGN PATENT DOCUMENTS

| | | |
|---|---|---|
| EP | 0 284 924 | 10/1988 |
| EP | 0 509 945 A2 | 10/1992 |
| EP | 0 732 834 A2 | 9/1996 |
| TW | 299543 | 3/1997 |
| WO | WO 96/13026 | 5/1996 |

OTHER PUBLICATIONS

IBM Technical Disclosure Bulletin, vol. 37 No. 028, Feb. 1994, "Changing System Configuration for Shared Windows Applications", pp. 505–506.

IBM Technical Disclosure Bulletin, vol. 40 No. 03, Mar. 1997, "Method for Enabling Software Updates through the Internet", pp. 123–124.

* cited by examiner

*Primary Examiner*—Viet D. Vu
(74) *Attorney, Agent, or Firm*—Schiff Hardin & Waite

(57) ABSTRACT

A method for updating program parameters deposited in a local configuration datafile, whereby a server is asked whether a new parameter datafile exists and this is potentially called from the server and transmitted into the local configuration datafile.

11 Claims, 2 Drawing Sheets

FIG. 1

```
<html>
<head>
<title>WebFacer-Configuration</title>
</head>
<body>
<hl>Config</hl>
<table>
    <tr>
        <td>Allow local browsing</td>
        <td>1</td>
        <td>DWORD</td>
    </tr>
    <tr>
        <td>Allow Mail</td>
        <td>0</td>
        <td>DWORD</td>
    </tr>
    <tr>
        <td>Always in Background</td>
        <td>0</td>
        <td>DWORD</td
    </tr>
    <tr>
        <td>Button Space</td>
        <td>6</td>
        </td>DWORD</td>
    </tr>
    </tr>
        <td>Confirm Exit After Timeout</td>
        <td>0</td>
        <td>DWORD</td>
    </tr>
</table>
</body>
</html>
```

PROGRAM PARAMETER UPDATING METHOD

CROSS REFERENCE TO RELATED APPLICATION

The present application is a Continuation-In-Part Application (CIP) of application Ser. No. 08/890,305, filed Jul. 9, 1997 now abandoned.

BACKGROUND OF THE INVENTION

1. Field of the Invention

The present invention is directed to a method for updating program parameters with using a data network connection.

2. Description of the Related Art

Programs in data processing systems often use what are referred to as configuration datafiles for parameterization in which parameters that are used during the execution of the program are stored.

Examples of such configuration datafiles are the datafiles having, for example, the name ".*. rc" which are in the home directory of a user of a UNIX operating system, the datafiles which end with the extension ".ini.", in particular the datafile "win.ini" in the graphic interface program "Windows 3.x" of Microsoft in which the "win.ini" file has been established as its own component, or the "registry" for the administration of such configuration information in the operating system "Windows 95" also by Microsoft, this also being considered below as a "datafile" even though with a hierarchic access procedure. In both of these latter instances, an interface is present as a part of the "Windows" program in order to read or write entries in the "ini"-datafiles or, respectively, in the registry file.

To set or change the parameters contained in such parameter files, use is made of menus and forms contained in the program itself to be configured, of separate configuration programs or, insofar as possible, of normal text editors which serve for the modification of the configuration entries. In all of these cases, however, an operator must use an output device—usually a picture screen, or monitor,—and an input device—usually a keyboard or a mouse—, both of which are directly and locally connected to the computer, and the operator must modify the entries in the configuration files.

Personal computers with a touch-sensitive picture screen running application software for public access are often provided as information kiosks built into a specific outer structure or housing. An example of such public access computers are available, for example, under the name "ELEKTRA" from Siemens Nixdorf Informationssysteme AG. These devices can be configured such that, after being turned on, only one application, the public access application, is activated. Such computers, however, do not allow any modification of the configuration data by a user since, of course, the computer is publicly accessible. If an update to the configuration data of the public accessible computer is necessary, the input of the update information can only be allowed after overcoming specific access restricting measures, such as by unlocking locks on the cabinet or housing and therefore such updates usually require the physical presence of an operator. This, however, results in a considerable expense especially if there are a great number of publicly accessible terminals to be updated.

SUMMARY OF THE INVENTION

An object of the present invention is to provide a method by which an application program can, for example, be reconfigured or updates in an information terminal without requiring a person who is authorized to perform maintenance on the information terminal having to be physically present.

The present invention is based on the perception that information terminals are often connected to server computers by a network because the application programs receive the information to be displayed on the information terminal by network access. According to the present invention, the application program determines by network access whether the configuration information of the information terminal is current and transmits and stores the updated information in the information terminal as warranted. Particular advantages of the invention derive given use of the HTTP protocols, as shall be explained in greater detail in the following.

In the present method, the updating of program parameters stored in a local configuration datafile in the information terminal provides that the parameters contained in such parameter files are changed, whereby a server is asked whether a new parameter datafile exists and if so the new datafile is transmitted from the server to the information terminal and is transferred into the local configuration datafile of the information terminal.

BRIEF DESCRIPTION OF THE DRAWINGS

FIG. 1 is a program printout or display of a parameter datafile as an HTML document in source code, as requested;

DETAILED DESCRIPTION OF THE PREFERRED EMBODIMENTS

Figure 2:
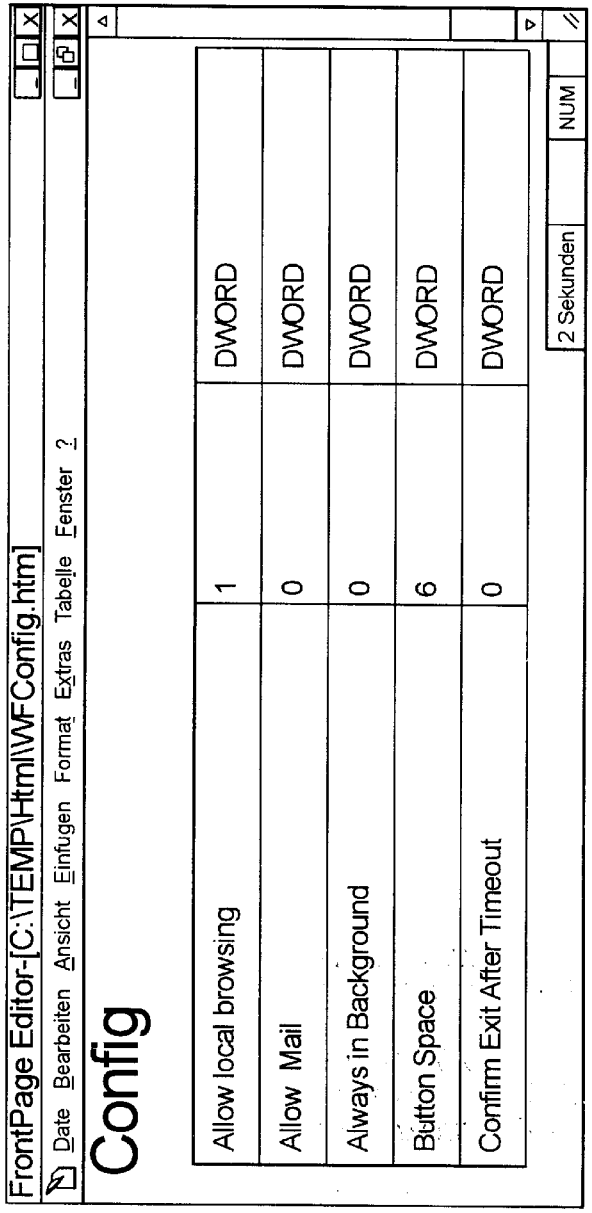
FIG. 2 a screen view of the same data file displayed with a browser program.

The present invention is described with reference to an application that runs under the graphic interface program WINDOWS of Microsoft and that can carry out a message exchange over a TCP/IP (Transmission Control Protocol/Internet Protocol) network via a socket interface. The Internet is an example of such a network. The "Hyper-Text Transfer Protocol" (HTTP), as described in the document RFC 1945 by T. Berners-Lee, R. Fielding, H. Frystyk, May 1996, is preferably used as the protocol in accordance with the present invention. The HTTP protocol employs a request-response strategy wherein the client computer sends a request and the server computer responds with a status or a return code and potentially transmits the requested document.

Upon installation of an application, which shall be referred to below as "MyApp", the network name of an update for the local parameter datafile which is, for example "http://remote-server.xxx/config/MyApp.htm" is deposited first in a parameter datafile under the code "ParamLocation", as is the date of the installation under the code "ParamDate". The character string "remote-server.xxx" thereby qualifies as a logical server according to the name and search conventions of the Internet; overall, the address of the parameter datafile represents an address referred to as a "Uniform Resource Locator" and abbreviated as URL whose structure can be derived, for example, from the publication RFC 1738 by T. Berners-Lee et al., December 1994.

During program execution, preferably during the program start, the following instructions, which are numbered for ease of referencing, are called, as will be described later in detail:

1. GetProfileString("MyApp", "ParamLocation", pLoc)
2. GetProfileString("MyApp", "ParamDate", pDate)
3. SendHttpRequest (pLoc+"If-Modified-Since: "+pDate)
4. if ReturnCode=304 then return (*unchanged*)
5. ObtainHttpResponse(someBuffer)
6. ParseAndStoreHtmlParamSpec(someBuffer)

With the 1st and 2nd instruction, the network address of the parameter server as well as the date of the last updating are identified. Here and below, the date is always to be understood as a time stamp as described in Section 3.3 of the publication RFC 1945. Other forms for identifying currentness information, for example consecutive version numbers of the application, are likewise possible when the network protocol supports these or can be appropriately expanded to use these.

The instruction "GetProfileString", which is a subroutine call, is documented in the Windows API as follows: "The GetProfileString function retrieves the string associated with the specific key in the given section of the WIN.INI file, where the section is 'MyApp', the key is 'ParamLocation' and pLoc is a pointer to the place where to store the information retrieved.

With the 3rd instruction, an inquiry is made of the server that, on the one hand, contains the name of the document— here, of the parameter datafile—and, as described in Section 10.9 of the publication RFC 1945, also contains an addition that requests that the server only send the document when it is more recent than the date communicated with the inquiry and specified by the character string "If-Modified-Since". If this is not the case, the server responds with the code 304, meaning that no newer information is available, that the client interrogates in the 4th step. When no newer information is available, then an update, of the configuration datafile is not necessary and this part of the process is terminated. When, however, the configuration datafile stored in the server is newer, then this is communicated within the framework of the response and is intermediately stored in the 5th step in order to then be analyzed by a control section in the 6th step and transferred into the parameter datafile, as will be explained in more detail further on.

Expediently, the configuration datafile that is transmitted over the network is written in the language HTML (HyperText Markup Language) as specified, for example, in the document RFC 1866, "Hypertext Markup Language— 2.0" by T. Barners-Lee and D. Conolly, November 1995. The employment of tables, which is proposed in the publication RFC 1942, "HTML Tables", by D. Raggett, May 1996, is thereby especially advantageous in the present invention, since data in tables may be easily identified at the receiving end.

FIG. 1 shows an example of such a datafile as requested over the network, the datafile being an HTML document such as would be displayed or printed in source code on a computer. In addition to the header and footer rows which are necessary for an HTML document, a table according to the RFC 1942 standard, which is introduced by the command "<table>" and terminated by the command "</table>", can be seen whose rows are enclosed by the commands "<tr>" and "</tr>" and whose entries in column sequence are enclosed with the commands "<td>" and "</td>".

Figure 3:
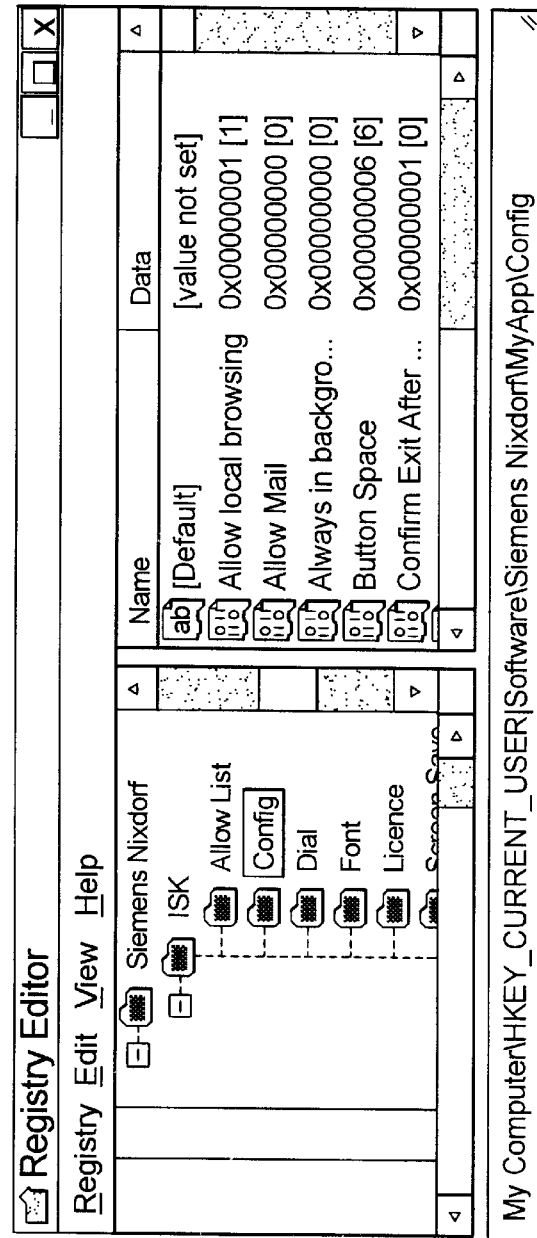
FIG. 3 is a screen view of the same datafile after it has been transferred into the Windows 95 registry.

When an HTML document of FIG. 1 is viewed with an HTML display program, also referred to as a browser, it appears generally as shown in FIG. 2. After transfer of the HTML document into the Windows95 registry, as will be described in more detail in the next paragraph, the image as shown in FIG. 3, for example, derives in an administration program for the registry file.

The processing of the HTML configuration datafile, the contents of which datafile are shown in FIG. 1, ensues to the effect that the third column is employed for the selection of a suitable function, i.e. whether the parameter is a number or a character string. In the following example, a browser program for a kiosk may be set to allow mail (e-mail) at the kiosk location. The second row of the table, used here for example, reads:

| Allow Mail | 1 | DWORD |
|---|---|---| and consists of three entries. These are isolated from the HTML text by matching the '<td>' and '</td>' strings of the table and extracting the text which is between these commands. The data is used to effect a program call, such as in Windows95:

WriteRegistryDword(path+"MyApp","Allow Mail", 1)

This function 'WriteRegistryDword' is a wrapper function that calls three functions from the Win32 API, which open the registry at the place denoted by the concatenation of the path and "MyApp", writes a "1" value for the key "AllowMail", and closes the registry again. The value of the path identification might well be "MyComputer\HKEY_CURRENT_USER\Software\SiemensNixdorf\MyApp\Config", as is shown in FIG. 3.

Under Windows 3.1, the call would read:
WriteProfileString("MyApp","AllowMail", "1") and in UNIX would approximately read:
cf=fopen(strcat(getenv(HOME),".rcMyApp"), "w");
fprintf(cf,"%s=%d\n","AllowMail",1);
fclose(cf)

The functions used in the UNIX example are well known from various sources, the "man" pages for example. The first line uses the function "getenv" to obtain the home directory of the user, uses the function "strcat" to append ".rcMyApp" giving a valid filename, and then opens this file for writing, creating it if it does not yet exist. In the second line, a single line is formatted and written from the beginning of the file, containing a keyword-value-pair bound by an equals sign. Then, in the third line, the file is closed.

This example is simplified to a single parameter for the sake of clarity; in normal cases support for a larger number of keyword-value pairs should be provided. Although this is not entirely trivial, it is a common operation that is well known from a number of open source UNIX applications.

Since the network address of the configuration data is itself a parameter, the method of the invention can also be employed to modify the server for the configuration datafile. The previous server must merely be continued for a certain time until there is a high probability that all clients located in the network were activated at least once.

By employing the HTTP protocol, particular advantages derive due to the transparent buffering of the datafiles. Assuming that the twenty display stations are connected to each of five locations, for example, these display stations respectively access the central computer via a relay station referred to as a "proxy". The relay station maintains a buffer and in fact sends a currentness question to the central server for every inquiry of the display stations but has the modified datafile transmitted only for the first inquiry. The relay station can satisfy the other nineteen inquiries from its buffer.

In FIG. 1, the word "Config" is marked as the first header row by the commands "<h1>" and "</h1>". This was employed to select the sub-directory given the entry into the registry as shown in FIG. 3. Since the header rows in HTML form a hierarchy, a hierarchy can thus be modeled in a simple way in the configuration datafile by a hierarchy in the parameter datafile, that is coded in HTML here.

A "Uniform Resource Locator" can also reference a datafile on the local computer on which the client program is executed, as presented in Chapter 3.10 of the publication RFC 1738. The parameter datafile can thus also be employed without network access. This means, on the one hand, that the parameter datafile can be processed with every program for producing HTML texts and a separate user documentation for the entries in the configuration datafile can be eliminated. The nature and form of the employment of a registry can thus be completely screened from the user. Moreover, operation without a network can also be achieved in a simple way for maintenance purposes.

The employment of the method is especially advantageous is an application usually referred to as a "browser" whose job is to call and display HTML-coded pages, since this contains the interfaces for the HTTP protocol.

The present invention has been described so far for a program that updates its own parameters. As the parameters for a program are rarely write protected against access by the program itself, this update process does not raise any security issues. However, the present invention also applies to updating parameters of a set of related programs that belong to the same family and fall under the same security restrictions. An example would be an office suite of business applications, where the applications share parameter file information. Moreover, the present invention might be used on some cases where a program updates a specified set of parameters that are not used during its own execution, as is already the case in the above example of a family of programs. In either case, the program uses a parameter file or mechanism that predefines the parameters to be updated in advance. The invention is not intended as a general means to set arbitrary parameters in the client from a remote site, however.

Although other modifications and changes may be suggested by those skilled in the art, it is the intention of the inventors to embody within the patent warranted hereon all changes and modifications as reasonably and properly come within the scope of their contribution to the art.

We claim:

1. A method for updating parameters of a client program or updating parameters of a program that is related to the client program by the same security restrictions via a data network, comprising the steps of:

using a local configuration datafile in the client program, the local configuration datafile being stored on a client computer on which the client program is executed;

executing the client program, including:

conducting an inquiry of a parameter datafile via the data network, the inquiry including an inquiry on currentness information of the local configuration datafile, and determining by the client program whether to update the parameters based on the currentness information, when the inquiry on currentness information yields an evaluation that the parameter datafile is newer than the local configuration datafile:

communicating the parameter datafile to the client program over the data network, and transferring parameters of the parameter datafile into the local configuration datafile by the client program on the client computer, using a data communication protocol for said inquiry on currentness information and said communication of said parameter datafile.

2. A method according to claim 1, wherein said communicating step uses HTTP as a communication protocol.

3. A method according to claim 2, wherein the parameter datafile is in the language HTML.

4. A method according to claim 3, wherein parameters in the parameter datafile are formatted as a table.

5. A method according to claim 3, wherein the parameter datafile is in a hierarchy corresponding to a hierarchy of the local configuration datafile.

6. A method according to claim 2, wherein the client program serves for displaying documents communicated via HTTP.

7. A method for updating parameter datafiles for a client program or updating parameters of a related program that is related to the client program by the same security restrictions, comprising the steps of:

starting the client program in a client computer connected to a network including a server;

sending an inquiry from the client computer to the server over the network as to the currentness of a parameter datafile by examining a configuration datafile of the client computer;

responding from the server to the client computer as to a currentness of a corresponding datafile on the server, said responding step including forwarding a more current datafile information if said inquiry yields a more current datafile on said server, said more current datafile information being forwarded over said network using a protocol; and updating a local configuration datafile in said client computer by said client program if said client program determines there is a more current datafile available with said more current datafile information, said updating step interpreting information in said more current datafile information written using said protocol.

8. A method as claimed in claim 7, wherein said protocol is HTTP and said more current datafile information forwarded over said network is in HTML.

9. A method as claimed in claim 7, wherein said client computer runs Windows 95 as an operating system and parameters in the registry are updated in said updating step.

10. A method as claimed in claim 7, wherein said client computer runs UNIX as an operating system.

11. A method as claimed in claim 7, wherein said client computer runs Windows 3.1 as an operating system and parameters in an *.INI file are updated in said updating step.

* * * * *